(12) United States Patent
Zhang

(10) Patent No.: US 11,063,727 B2
(45) Date of Patent: Jul. 13, 2021

(54) METHOD AND DEVICE IN UE AND BASE STATION FOR MULTI-ANTENNA SYSTEM

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 207 days.

(21) Appl. No.: 16/396,800

(22) Filed: Apr. 29, 2019

(65) Prior Publication Data

US 2019/0253218 A1  Aug. 15, 2019

Related U.S. Application Data

(63) Continuation of application No. PCT/CN2017/108482, filed on Oct. 31, 2017.

(30) Foreign Application Priority Data

Nov. 1, 2016 (CN) .................. 201610940656.0

(51) Int. Cl.
| | |
|---|---|
| *H04L 5/00* | (2006.01) |
| *H04W 72/04* | (2009.01) |
| *H04B 7/0404* | (2017.01) |
| *H04L 27/26* | (2006.01) |
| *H04W 16/28* | (2009.01) |
| *H04B 7/06* | (2006.01) |
| *H04L 1/00* | (2006.01) |

(52) U.S. Cl.
CPC ......... *H04L 5/0051* (2013.01); *H04B 7/0404* (2013.01); *H04B 7/0691* (2013.01);
(Continued)

(58) Field of Classification Search
CPC ......... H04L 5/0051; H04L 27/26; H04L 1/00; H04L 5/0053; H04L 5/0048;
(Continued)

(56) References Cited

U.S. PATENT DOCUMENTS

| | | | |
|---|---|---|---|
| 2012/0275495 A1 | 11/2012 | Bergman et al. | |
| 2013/0265962 A1* | 10/2013 | Ouchi | H04W 72/02 370/329 |

(Continued)

FOREIGN PATENT DOCUMENTS

| | | |
|---|---|---|
| CN | 102332945 A | 1/2012 |
| CN | 102932112 A | 2/2013 |

(Continued)

OTHER PUBLICATIONS

ISR received in application No. PCT/CN2017/108482 dated Jan. 23, 2018.

(Continued)

*Primary Examiner* — Kiet Tang

(57) ABSTRACT

The present disclosure provides a method and a device in User Equipment and a base station for multi-antenna system. The UE first receives a first signaling, a second signaling, a first reference signal and a second reference signal; and transmits first channel information. The first and second reference signals respectively comprises Q1 RS port(s) and Q2 RS port(s), the Q1 RS port(s) and Q2 RS port(s) are respectively transmitted by Q1 antenna port(s) and Q2 antenna port(s). The first signaling and second signaling are respectively used to determine L1 antenna port(s) and Q1 antenna port(s), the Q1 antenna port(s) is(are) a subset of the L1 antenna port(s). Herein, the Q1 and Q2 are positive integers respectively, the L1 is a positive integer greater than or equal to the Q1. The first channel information corresponds to Q antenna ports, the Q is a sum of the Q1 and Q2.

20 Claims, 9 Drawing Sheets

(52) U.S. Cl.
CPC .............. *H04L 1/00* (2013.01); *H04L 5/0053* (2013.01); *H04L 27/26* (2013.01); *H04W 16/28* (2013.01); *H04W 72/046* (2013.01); *H04W 72/0413* (2013.01); *H04W 72/0446* (2013.01)

(58) Field of Classification Search
CPC .. H04L 5/0092; H04W 16/28; H04W 72/046; H04W 72/0413; H04W 72/0446; H04B 7/0691; H04B 7/0404
See application file for complete search history.

(56) References Cited

U.S. PATENT DOCUMENTS

| | | | |
|---|---|---|---|
| 2015/0043673 A1* | 2/2015 | Lee | H04B 7/0632 |
| | | | 375/267 |
| 2018/0367274 A1* | 12/2018 | Shi | H04L 1/1614 |

FOREIGN PATENT DOCUMENTS

| | | |
|---|---|---|
| CN | 104753646 A | 7/2015 |
| CN | 105429683 A | 3/2016 |
| CN | 105515732 A | 4/2016 |
| CN | 105577318 A | 5/2016 |

OTHER PUBLICATIONS

CN Search Report in application No. 201610940656.0 dated Apr. 11, 2019.
CN First Office Action in Application No. 201610940656.0 dated Apr. 18, 2019.
CN Grant Notice in Application No. 201610940656.0 dated Nov. 21, 2019.

* cited by examiner

METHOD AND DEVICE IN UE AND BASE STATION FOR MULTI-ANTENNA SYSTEM

CROSS-REFERENCE TO RELATED APPLICATION

This application is a continuation of International Application No. PCT/CN2017/108482, filed Oct. 31, 2017, claiming the priority benefit of Chinese Patent Application Serial Number 201610940656.0, filed on Nov. 1, 2016, the full disclosure of which is incorporated herein by reference.

BACKGROUND

Technical Field

The present disclosure relates to transmission methods and devices in wireless communication systems, and in particular to a transmission scheme and device for a wireless communication system with a great many antennas deployed at a base station side.

Related Art

In downlink multi-antenna transmission, a User Equipment (UE) usually performs downlink channel estimation by measuring downlink reference signals transmitted by a base station, and then feeds back Channel State Information (CSI) to assist the base station in implementing precoding. In traditional $3^{rd}$ Generation Partner Project (3GPP) cellular network system, periodic downlink reference signals are supported, including cell common and UE-specific downlink reference signals.

In next generation wireless communication systems, there will be an increase in the number of antennas equipped at the base station side, followed by higher overhead required by traditional periodic downlink reference signals. In order to reduce overhead of downlink reference signals, both aperiodic downlink reference signals and downlink reference signals using beamforming are discussed in 3GPP R (Release) 13 and R 14.

SUMMARY

The inventor finds through researches that aperiodic downlink reference signals and periodic reference signals sometimes (partially) correspond to the same antenna ports, for instance, (part of) aperiodic downlink reference signals and (part of) periodic downlink reference signals are transmitted from a same antenna group with adopting a same beamforming vector. In such circumstance, aperiodic reference signals corresponding to the same antenna group as periodic reference signals do not need to be transmitted, so that channel estimation based on aperiodic reference signals may be performed by jointly utilizing (part of) periodic reference signals and aperiodic reference signals, thus cutting down the overhead of aperiodic downlink reference signals.

In view of the above problem, the present disclosure provides a solution. It should be noted that the embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for multi-antenna transmission, comprising:
  receiving a first signaling, a second signaling, a first reference signal and a second reference signal; and
  transmitting first channel information;
  wherein the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the first channel information is Channel State Information (CSI).

In one embodiment, a measurement of the first reference signal and the second reference signal is used to determine the first channel information.

In one embodiment, the first channel information comprises at least one of a Rank Indicator (RI), a Precoder Type Indication (PTI), a Precoding Matrix Indicator (PMI), a Channel Quality Indicator (CQI) or a channel parameter quantization value or at least one of its groups.

In one embodiment, the first signaling is a higher-layer signaling, the second signaling is a physical layer signaling.

In one subembodiment of the above embodiment, the first signaling is Radio Resource Control (RRC) layer signaling.

In one embodiment, the first signaling is a physical layer signaling, the second signaling is a physical layer signaling.

In one embodiment, the first signaling triggers multiple transmissions from the L1 antenna port(s), the second signaling triggers a transmission from the Q2 antenna port(s), the Q1 antenna port(s) is(are) a subset of the L1 antenna port(s).

In one embodiment, the first signaling is common to the cell.

In one embodiment, the first signaling is a Master Information Block (MIB).

In one embodiment, the first signaling is a System Information Block (SIB).

In one embodiment, the Q1 is 1.

In one embodiment, the Q1 is equal to the L1.

In one embodiment, the Q1 antenna port(s) and the Q2 antenna port(s) do not overlap each other, there does not exist any antenna port that belongs to both the Q1 antenna port(s) and the Q2 antenna port(s).

In one embodiment, in the above method, a channel estimation for the Q1 antenna port(s) may be performed by measuring the first reference signal, with no need to include reference signals transmitted from the Q1 antenna port(s) into the second reference signal, thereby reducing an overhead of the second reference signal.

In one embodiment, the first reference signal is transmitted in a first time resources pool, and the second reference signal is transmitted in a second time resources pool.

In one subembodiment of the above embodiment, the first reference signal occurs multiple times in the first time resources pool, and time intervals between any two adjacent occurrences of the first reference signal in the first time resources pool are equal.

In one subembodiment of the above embodiment, the second reference signal occurs once in the second time resources pool.

In one subembodiment of the above embodiment, the first time resources pool comprises a positive integer of time unit(s), the second time resources pool comprises a positive integer number of consecutive time units. In one subembodiment, the time unit is a subframe. In one subembodiment, the time unit is 1 ms. In one subembodiment, time units in the second time resources pool do not belong to the first time resources pool. In one subembodiment, time units in the second time resources pool belong to the first time resources pool.

In one embodiment, physical layer channels corresponding to the second signaling comprise a downlink physical layer control channel (i.e., a downlink channel which can only be used for bearing physical layer control information). In one subembodiment, the downlink physical layer control channel is a Physical Downlink Control Channel (PDCCH).

In one embodiment, the first reference signal is wideband. In one subembodiment, a system bandwidth is divided into a positive integer number of frequency domains, the first reference signal occurs in all frequency domains within the system bandwidth, a bandwidth corresponding to each of the frequency domains is equal to a difference between frequency domain resources occupied by two adjacent occurrences of the first reference signal in frequency domain.

In one embodiment, the second reference signal is wideband.

In one embodiment, the second reference signal is narrowband. In one subembodiment, a system bandwidth is divided into a positive integer number of frequency domains, the second reference signal occurs in only part of the frequency domains.

In one embodiment, an antenna port is formed by multiple antennas through antenna virtualization superposition, a mapping coefficient of the multiple antennas to the antenna port constitutes a beamforming vector. In one subembodiment, small scale characteristics of a radio channel experienced by signals transmitted from a first antenna port cannot be used to infer small scale characteristics of a radio channel experienced by signals transmitted from a second antenna port. The first antenna port and the second antenna port are any two different antenna ports.

In one embodiment, the first channel information comprises Uplink Control Information (UCI).

In one embodiment, the first channel information is transmitted on an uplink physical layer control channel (i.e., an uplink channel which can only be used for bearing physical layer signaling). In one subembodiment, the uplink physical layer control channel is a Physical Uplink Control Channel (PUCCH).

In one embodiment, the first channel information is transmitted on an uplink physical layer data channel (i.e., an uplink channel which can be used for bearing physical layer data). In one subembodiment, the uplink physical layer data channel is a Physical Uplink Shared Channel (PUSCH).

In one embodiment, the first channel information is used to determine a first matrix, an overall number of rows contained by the first matrix is equal to the Q.

In one subembodiment, the first matrix is formed by quantization of a first channel matrix, the first reference signal is used to determine a downlink channel parameter corresponding to the Q1 antenna port(s), the second reference signal is used to determine a downlink channel parameter corresponding to the Q2 antenna port(s), the downlink channel parameter corresponding to the Q1 antenna port(s) and the downlink channel parameter corresponding to the Q2 antenna port(s) constitute the first channel matrix.

In one subembodiment, the downlink channel parameter corresponding to the Q1 antenna port(s) and the downlink channel parameter corresponding to the Q2 antenna port(s) are a Channel Impulse Response (CIR) respectively.

In one subembodiment, the first channel information is quantization information of the first matrix. In one subembodiment, the first channel information is an index for the first matrix in a candidate matrix set, the candidate matrix set comprises a positive integer number of matrices.

In one subembodiment, the first channel information comprises M index group(s) and M parameter group(s), the M index group(s) is(are) used to determine M vector group(s), the M vector group(s) correspond to the M parameter group(s) respectively, the M vector group(s) and the M parameter group(s) are respectively used to generate M composite vector(s), the M composite vector(s) is(are) used to determine the first matrix. The M is a positive integer.

In one subembodiment, vector(s) of the M vector group(s) belongs (belong) to a candidate vector set, the candidate vector set comprises a positive integer number of vectors.

In one subembodiment, a given composite vector is a sum of vectors of a given vector group weighted by parameters in a given parameter group, wherein the given composite vector is any one of the M composite vector(s), the given vector group is the vector group used to generate the given composite vector in the M vector group(s), the given parameter group is the parameter group used to generate the given composite vector in the M parameter group(s).

In one subembodiment, the first matrix consists of M composite vector(s) as column vector(s).

In one subembodiment, one of the vector group comprises L vectors, a corresponding coefficient group comprises L−1 coefficient(s).

In one subembodiment, one vector group comprises L vectors, a corresponding coefficient group comprises L coefficients.

Specifically, according to one aspect of the present disclosure, comprising:

transmitting first information.

Herein, the first information indicates Q3 antenna port(s) out of the L1 antenna port(s); the Q3 is a positive integer less than or equal to the L1.

In one embodiment, the first information is transmitted on a physical layer control channel.

In one embodiment, the first information is transmitted on a physical layer data channel.

In one embodiment, the first information is Channel-state information reference signals Resource Indicator (CRI).

In one embodiment, time domain resources occupied by any two of the L1 antenna ports are orthogonal.

In one embodiment, the Q3 is equal to the Q1. In one subembodiment, the Q3 antenna port(s) is(are) equal to the Q1 antenna port(s).

In one embodiment, the Q3 antenna port(s) is(are) used to determine the Q1 antenna port(s).

In one embodiment, the Q1 antenna port(s) is(are) a subset of the Q3 antenna port(s), the Q3 is greater than or equal to the Q1.

In one embodiment, the Q3 antenna port(s) is(are) a subset of the Q1 antenna port(s), the Q1 is greater than or equal to the Q3.

Specifically, according to one aspect of the present disclosure, comprising:

receiving second information;

herein, the second information indicates the Q1 antenna port(s) out of the L1 antenna port(s).

In one embodiment, the second information is carried by the second signaling.

In one embodiment, the second information is transmitted on a physical layer control channel.

Specifically, according to one aspect of the present disclosure, wherein position(s) of the Q1 antenna port(s) in the Q antenna ports is(are) determined by default.

In one embodiment, the Q1 antenna port(s) corresponds (correspond) to first Q1 antenna port(s) of the Q antenna ports respectively.

In one subembodiment, the Q2 antenna port(s) corresponds (correspond) to last Q2 antenna port(s) of the Q antenna ports respectively.

In one embodiment, the Q1 antenna port(s) corresponds (correspond) to last Q1 antenna port(s) of the Q antenna ports respectively.

In one subembodiment, the Q2 antenna port(s) corresponds (correspond) to first Q2 antenna port(s) of the Q antenna ports respectively.

Specifically, according to one aspect of the present disclosure, wherein beamforming vector(s) corresponding to the Q1 antenna port(s) is(are) used to determine beamforming vector(s) corresponding to transmission antenna port(s) for the second signaling.

In one embodiment, the transmission antenna port(s) for the second signaling comprises (comprise) part or all of the Q1 antenna port(s).

In one embodiment, beamforming vector(s) corresponding to the Q1 antenna port(s) is(are) beamforming vector(s) corresponding to transmission antenna port(s) for the second signaling.

In one embodiment, the beamforming vectors corresponding to the Q1 antenna ports comprise Q1 vectors, the Q1 vectors are of equal dimensions, the Q1 antenna ports correspond to the Q1 vectors respectively.

In one embodiment, the above method ensures that the second signaling is transmitted via a beamforming vector pointing to the UE, which improves transmission reliability and efficiency of the second signaling.

Specifically, according to one aspect of the present disclosure, comprising:

receiving a first radio signal;

herein, the first channel information is used to generate the first radio signal.

In one embodiment, the first channel information is used to determine a precoding matrix corresponding to the first radio signal.

In one embodiment, column vectors of a precoding matrix corresponding to the first radio signal comprises part of or all column vectors of the first matrix.

In one embodiment, the first radio signal is transmitted on a downlink physical layer data channel (i.e., a channel which can be used for bearing physical layer data). In one subembodiment, the downlink physical layer data channel is Physical Downlink Shared Channel (PDSCH).

In one embodiment, a transmission channel corresponding to the first radio signal is a Downlink Shared Channel (DL-SCH).

In one embodiment, the first radio signal also comprises physical layer data.

The present disclosure provides a method in a base station for multi-antenna transmission, comprising:

transmitting a first signaling, a second signaling, a first reference signal and a second reference signal; and receiving first channel information;

herein, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, a measurement of the first reference signal and the second reference signal is used to determine the first channel information.

In one embodiment, the first signaling is a higher-layer signaling, the second signaling is a physical layer signaling.

In one embodiment, the first signaling is a physical layer signaling, the second signaling is a physical layer signaling.

In one embodiment, the first signaling triggers multiple transmissions from the L1 antenna port(s), the second signaling triggers a transmission from the Q2 antenna port(s), the Q1 antenna port(s) is(are) a subset of the L1 antenna port(s).

In one embodiment, the Q1 is 1.

In one embodiment, the first reference signal is transmitted in a first time resources pool, the second reference signal is transmitted in a second time resources pool.

In one subembodiment, the first reference signal occurs multiple times in the first time resources pool, and time intervals between any two adjacent occurrences of the first reference signal in the first time resources pool are equal.

In one subembodiment, the second reference signal occurs once in the second time resources pool.

In one embodiment, the first reference signal is wideband. In one subembodiment, a system bandwidth is divided into a positive integer number of frequency domain(s), the first reference signal occurs in all frequency domain(s) within the system bandwidth, a bandwidth corresponding to each of the frequency domain(s) is equal to a difference between frequency domain resources occupied by two adjacent occurrences of the first reference signal in frequency domain.

In one embodiment, the second reference signal is wideband.

In one embodiment, the second reference signal is narrowband. In one subembodiment, a system bandwidth is divided into a positive integer number of frequency domain(s), the second reference signal only occurs in part of the frequency domain(s).

In one embodiment, the antenna port is formed by multiple antennas through antenna virtualization superposition, a mapping coefficient of the multiple antennas to the antenna port constitutes a beamforming vector.

In one embodiment, the first channel information comprises Uplink Control Information (UCI).

Specifically, according to one aspect of the present disclosure, comprising:

receiving first information;

herein, the first information indicates Q3 antenna port(s) out of the L1 antenna port(s); the Q3 is a positive integer less than or equal to the L1.

In one embodiment, time domain resources occupied by any two of the L1 antenna ports are orthogonal.

In one embodiment, the Q3 is equal to the Q1. In one subembodiment, the Q3 antenna port(s) is(are) equal to the Q1 antenna port(s).

In one embodiment, the Q3 antenna port(s) is(are) used to determine the Q1 antenna port(s).

Specifically, according to one aspect of the present disclosure, comprising:

transmitting second information;

herein, the second information indicates the Q1 antenna port(s) out of the L1 antenna port(s).

In one embodiment, the second information is carried by the second signaling.

Specifically, according to one aspect of the present disclosure, wherein position(s) of the Q1 antenna port(s) in the Q antenna ports is(are) determined by default.

In one embodiment, the Q1 antenna port(s) corresponds (correspond) to first Q1 antenna port(s) of the Q antenna ports respectively.

In one subembodiment, the Q2 antenna port(s) corresponds (correspond) to last Q2 antenna port(s) of the Q antenna ports respectively.

In one embodiment, the Q1 antenna port(s) corresponds (correspond) to last Q1 antenna port(s) of the Q antenna ports respectively.

In one subembodiment, the Q2 antenna port(s) corresponds (correspond) to first Q2 antenna port(s) of the Q antenna ports respectively.

Specifically, according to one aspect of the present disclosure, wherein beamforming vector(s) corresponding to the Q1 antenna port(s) is(are) used to determine beamforming vector(s) corresponding to transmission antenna port(s) for the second signaling.

In one embodiment, the transmission antenna port(s) for the second signaling comprises (comprise) part or all of the Q1 antenna port(s).

In one embodiment, beamforming vector(s) corresponding to the Q1 antenna port(s) is (are) beamforming vector(s) corresponding to transmission port(s) for the second signaling.

Specifically, according to one aspect of the present disclosure, comprising:

transmitting a first radio signal;

herein, the first channel information is used to generate the first radio signal.

In one embodiment, the first channel information is used to determine a precoding matrix corresponding to the first radio signal.

The present disclosure provides a user equipment (UE) for multi-antenna transmission, comprising:

a first receiver: receiving a first signaling, a second signaling, a first reference signal and a second reference signal; and a first transmitter: transmitting first channel information;

herein, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the first signaling triggers multiple transmissions from the L1 antenna port(s), the second signaling triggers a transmission from the Q2 antenna port(s), the Q1 antenna port(s) is(are) a subset of the L1 antenna port(s).

In one embodiment, the Q1 is 1.

In one embodiment, the above UE is characterized in that the first transmitter further transmits first information. Herein, the first information indicates Q3 antenna port(s) out of the L1 antenna port(s). The Q3 is a positive integer less than or equal to the L1.

In one embodiment, the Q3 is equal to the Q1. In one subembodiment, the Q3 antenna port(s) is(are) equal to the Q1 antenna port(s).

In one embodiment, the Q3 antenna port(s) is(are) used to determine the Q1 antenna port(s).

In one embodiment, the above UE is characterized in that the first receiver further receives second information. Herein, the second information indicates the Q1 antenna port(s) out of the L1 antenna port(s).

In one embodiment, the second information is carried by the second signaling.

In one embodiment, the UE is characterized in that position(s) of the Q1 antenna port(s) in the Q antenna ports is(are) determined by default.

In one embodiment, the UE is characterized in that beamforming vector(s) corresponding to the Q1 antenna port(s) is(are) used to determine beamforming vector(s) corresponding to transmission antenna port(s) for the second signaling.

In one embodiment, the UE is characterized in that the first receiver further receives a first radio signal. Herein, the first channel information is used to generate the first radio signal.

In one embodiment, the first channel information is used to determine a precoding matrix corresponding to the first radio signal.

The present disclosure provides a base station for multi-antenna transmission, comprising:

a second transmitter: transmitting a first signaling, a second signaling, a first reference signal and a second reference signal; and a second receiver: receiving first channel information;

herein, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the base station is characterized in that the second receiver further receives first information. Herein, the first information indicates Q3 antenna port(s) out of the L1 antenna port(s). The Q3 is a positive integer less than or equal to the L1.

In one embodiment, the base station is characterized in that the second transmitter further transmits second information. Herein, the second information indicates the Q1 antenna port(s) out of the L1 antenna port(s).

In one embodiment, the above base station is characterized in that position(s) of the Q1 antenna port(s) in the Q antenna ports is(are) determined by default.

In one embodiment, the above base station is characterized in that beamforming vector(s) corresponding to the Q1 antenna port(s) is(are) used to determine beamforming vector(s) corresponding to transmission antenna port(s) for the second signaling.

In one embodiment, the above base station is characterized in that the second transmitter further transmits a first radio signal. Herein, the first channel information is used to generate the first radio signal.

The present disclosure has the following advantages over conventional schemes:

When (part of) aperiodic downlink reference signals and (part of) periodic downlink reference signals share a same antenna port, for instance, (part of) aperiodic downlink reference signals and (part of) periodic downlink reference signals adopt same beamforming vectors to be transmitted from a same antenna group, the present disclosure allows jointly utilizing (part of) periodic downlink reference signals and aperiodic downlink reference signals to perform channel estimation of aperiodic downlink reference signals. With this method, aperiodic downlink reference signals which share the same antenna port(s) with periodic reference signals do not need to be transmitted, thus reducing the overhead of aperiodic downlink reference signals.

BRIEF DESCRIPTION OF THE DRAWINGS

Other features, purposes and advantages of the present disclosure will become more apparent from the detailed description of non-restrictive embodiments taken in conjunction with the following drawings.

EMBODIMENT 1

Figure 1:
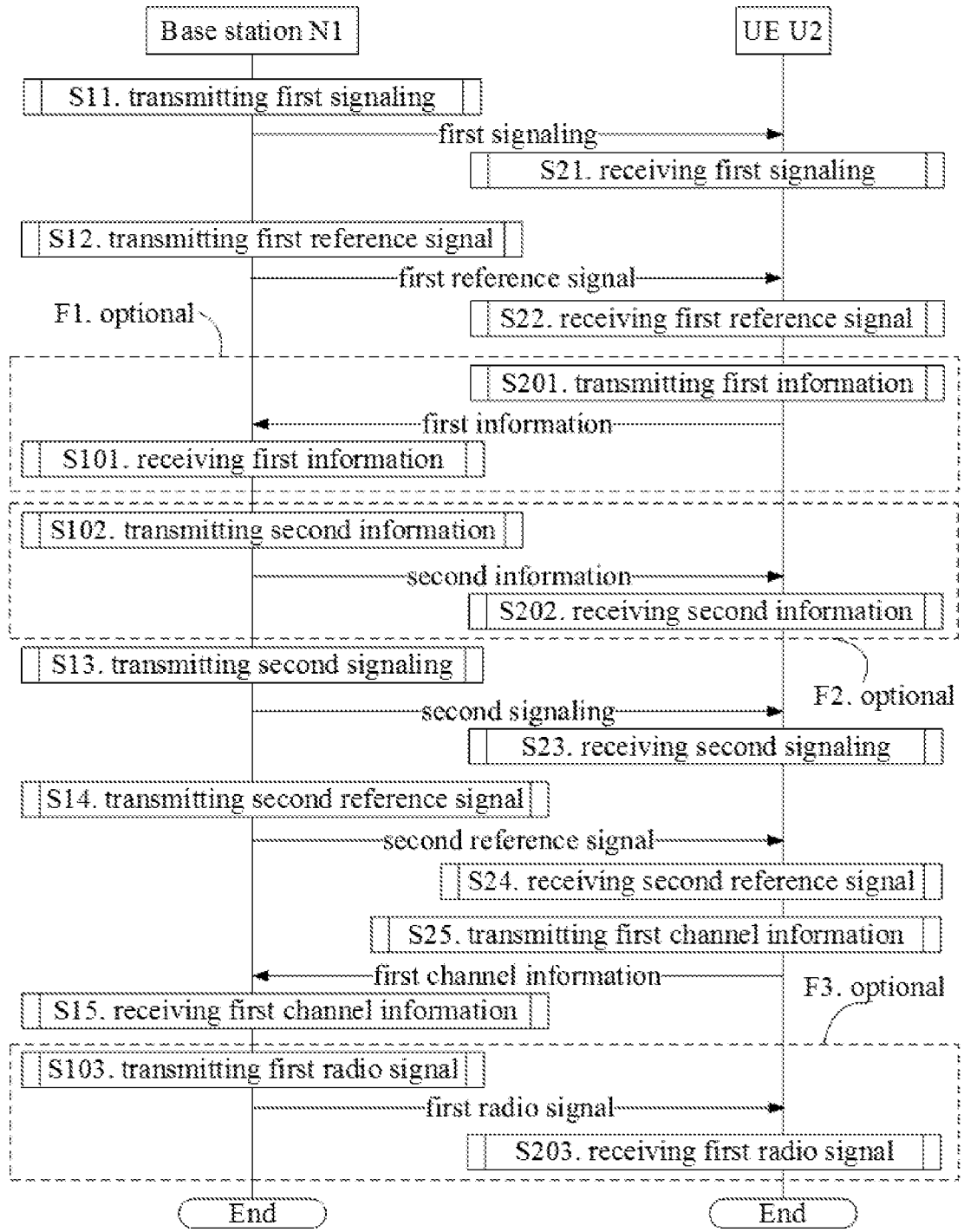
FIG. 1 is a flowchart of wireless transmission according to one embodiment of the present disclosure.

Embodiment 1 illustrates a flowchart of wireless transmission, as shown in FIG. 1. In FIG. 1, a base station N1 is a maintenance base station for a serving cell of a UE U2. Steps in blocks F1, F2 and F3 are optional, respectively.

The base station N1 transmits a first signaling in step S11; transmits a first reference signal in step S12; receives first information in step S101; transmits second information in step S102; transmits a second signaling in step S13; transmits a second reference signal in step S14; receives first channel information in step S15; and transmits a first radio signal in step S103.

The UE U2 receives a first signaling in step S21; receives a first reference signal in step S22; transmits first information in step S201; receives second information in step S202; receives a second signaling in step S23; receives a second reference signal in step S24; transmits first channel information in step S25; and receives a first radio signal in step S203.

In Embodiment 1, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2. The first information indicates Q3 antenna port(s) out of the L1 antenna port(s). The Q3 is a positive integer less than or equal to the L1. The second information indicates the Q1 antenna port(s) out of the L1 antenna port(s). The first channel information is used to generate the first radio signal.

In one embodiment, position(s) of the Q1 antenna port(s) in the Q antenna ports is(are) determined by default.

In one embodiment, beamforming vector(s) corresponding to the Q1 antenna port(s) is(are) used to determine beamforming vector(s) corresponding to transmission antenna port(s) for the second signaling.

In one embodiment, the first channel information is CSI.

In one subembodiment, the first channel information comprises at least one of RI, PTI, PMI, CQI, or a channel parameter quantization value or at least one of its groups.

In one embodiment, a measurement of the first reference signal and the second reference signal is used to determine the first channel information.

In one embodiment, the first signaling is a higher-layer signaling, the second signaling is a physical layer signaling.

In one subembodiment, the first signaling is an RRC layer signaling.

In one embodiment, the first signaling is a physical layer signaling, the second signaling is a physical layer signaling.

In one embodiment, the first signaling triggers multiple transmissions from the L1 antenna port(s), the second signaling triggers a transmission from the Q2 antenna port(s).

In one embodiment, the first signaling is common to a cell.

In one embodiment, the Q1 is 1.

In one embodiment, the Q1 is equal to the L1.

In one embodiment, the Q1 antenna port(s) and the Q2 antenna port(s) do not overlap each other, there does not exist any of the antenna port(s) that belongs to the Q1 antenna port(s) and the Q2 antenna port(s) at the same time.

In one embodiment, the first channel information comprises Uplink Control Information (UCI).

In one embodiment, the first information is CRI.

In one embodiment, time domain resources occupied by any two of the L1 antenna port(s) are orthogonal.

In one embodiment, the antenna port is formed by multiple antennas through antenna virtualization superposition, a mapping coefficient of the multiple antennas to the antenna port constitutes a beamforming vector.

In one embodiment, the Q3 is equal to the Q1. In one subembodiment, the Q3 antenna port(s) is(are) equal to the Q1 antenna port(s).

In one embodiment, the Q3 antenna port(s) is(are) used to determine the Q1 antenna port(s).

In one embodiment, the Q1 antenna port(s) is(are) a subset of the Q3 antenna port(s), the Q3 is greater than or equal to the Q1.

In one embodiment, the second information is carried by the second signaling.

In one embodiment, transmission antenna port(s) for the second signaling comprise (comprise) part or all of the Q1 antenna port(s).

In one embodiment, beamforming vector(s) corresponding to the Q1 antenna port(s) is(are) beamforming vector(s) corresponding to transmission antenna port(s) for the second signaling.

In one embodiment, the first channel information is used to determine a precoding matrix corresponding to the first radio signal.

EMBODIMENT 2

Figure 2:
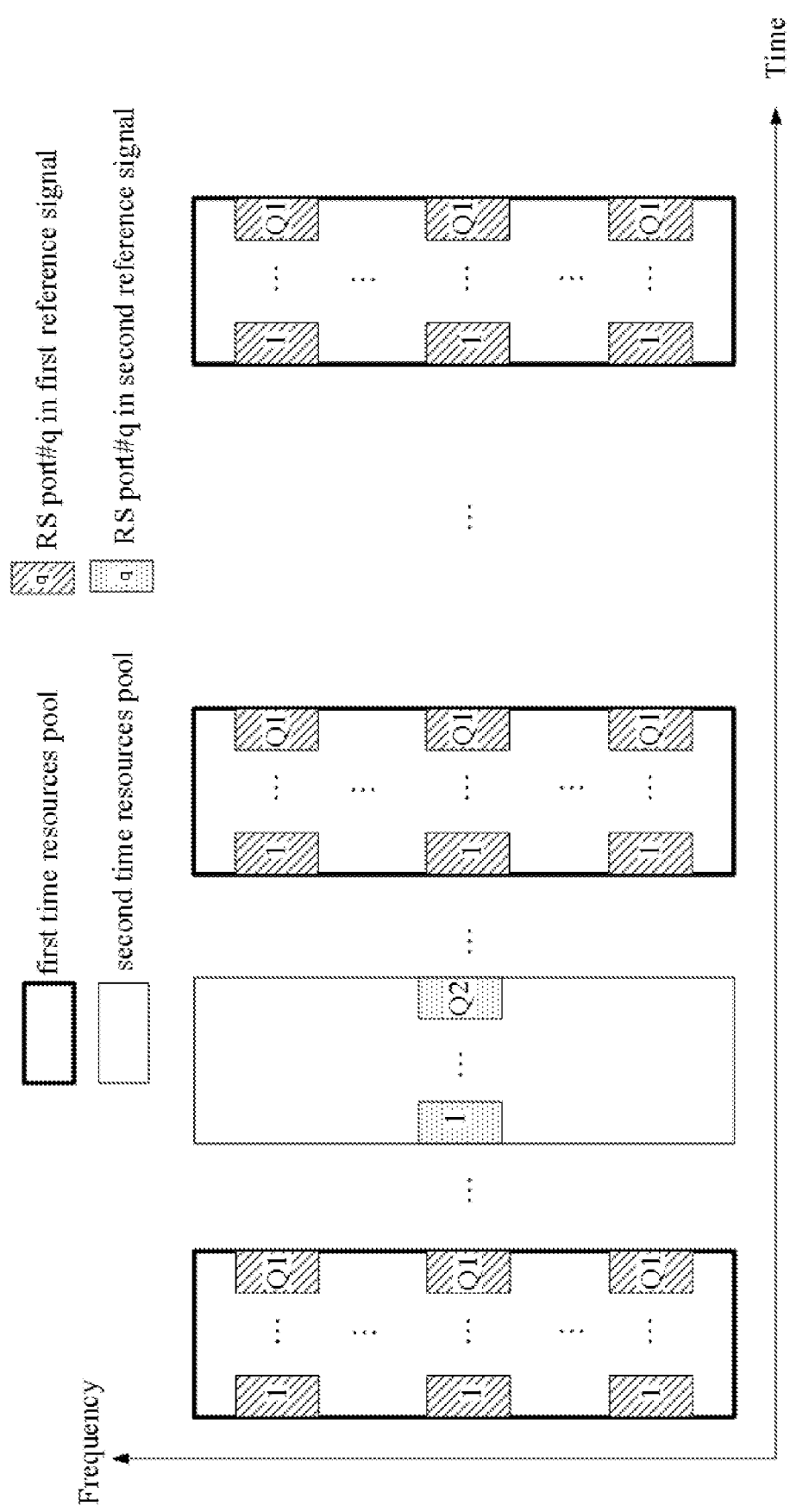
FIG. 2 is a schematic diagram of the resources mapping of RS ports in a first reference signal and a second reference signal according to one embodiment of the present disclosure.

Embodiment 2 illustrates a schematic diagram of the resources mapping of RS ports in a first reference signal and a second reference signal, as shown in FIG. 2.

In Embodiment 2, the first reference signal is transmitted on a first time resources pool, the second reference signal is transmitted in a second time resources pool. The first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively. In FIG. 2, a thick solid line box represents the first time resources pool, a thin solid line box represents the second time resources pool, a block filled with slashes represents each of the Q1 RS port(s), a block filled with dots represents each of the Q2 RS port(s).

In one embodiment, the first time resources pool comprises a positive integer number of time unit(s), the second resources pool comprises a positive integer number of time unit(s).

In one subembodiment, the first time resources pool comprises a positive integer number of non-consecutive time units.

In one subembodiment, the second time resources pool comprises a positive integer number of consecutive time units.

In one subembodiment, the time unit is a subframe.

In one subembodiment, the time unit is 1 ms.

In one subembodiment, time units of the second time resources pool do not belong to the first time resources pool.

In one embodiment, the first reference signal occurs multiple times in the first time resources, In one embodiment, the second reference signal occurs once in the second time resources pool.

In one embodiment, time domain resources occupied by any two of the Q1 antenna port(s) are orthogonal.

In one embodiment, the first reference signal is wideband.

In one subembodiment, a system bandwidth is divided into a positive integer number of frequency domain(s), the first reference signal occurs in all frequency domain(s) within the system bandwidth, a bandwidth corresponding to each of the frequency domain(s) is equal to a difference between frequency domain resources occupied by two adjacent occurrences of the first reference signal in frequency domain.

In one embodiment, the second reference signal is narrowband.

In one subembodiment, a system bandwidth is divided into a positive integer number of frequency domain(s), the second reference signal only occurs in part of the frequency domain(s).

EMBODIMENT 3

Figure 3:
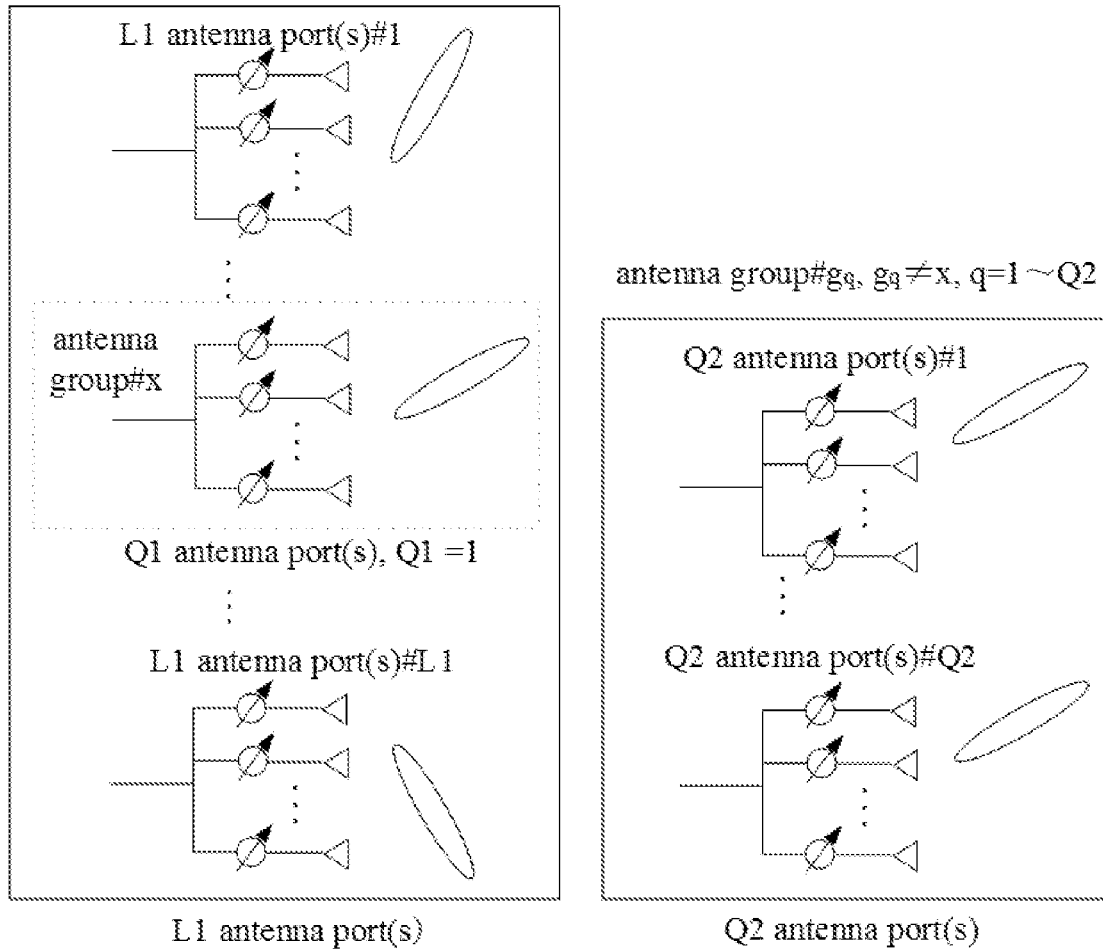
FIG. 3 is a schematic diagram illustrating a relationship between L1 antenna port(s), Q1 antenna port(s) and Q2 antenna port(s) according to one embodiment of the present disclosure.

Embodiment 3 illustrates a schematic diagram illustrating a relationship between L1 antenna port(s), Q1 antenna port(s) and Q2 antenna port(s), as shown in FIG. 3.

In Embodiment 3, antennas configured by a base station is divided into G antenna groups, each of the antenna groups comprises multiple antennas. An antenna port is formed by multiple antennas through antenna virtualization superposition, a mapping coefficient of the multiple antennas in the one antenna group to the antenna port constitutes a beamforming vector. The Q1 antenna port(s) is(are) a subset of the L1 antenna port(s).

In one embodiment, beamforming vectors corresponding to the L1 antenna port(s) vary from one to another.

In one embodiment, time domain resources occupied by any two of the L1 antenna ports are orthogonal.

In one embodiment, the Q1 is equal to 1.

In one embodiment, beamforming vector(s) corresponding to the Q2 antenna port(s) is(are) equal to beamforming vector(s) corresponding to the Q1 antenna port(s) respectively.

In one subembodiment, antenna groups corresponding to the Q2 antenna port(s) are different from those corresponding to the Q2 antenna port(s). There does not exist an antenna group simultaneously utilized by the Q2 antenna port(s) and the Q1 antenna port(s).

In one embodiment, small scale characteristics of a radio channel experienced by signals transmitted from a first antenna port cannot be used to infer small scale characteristics of a radio channel experienced by signals transmitted from a second antenna port. The first antenna port and the second antenna port are any two different antenna ports.

In one embodiment, first channel information corresponds to Q antenna ports, the Q antenna ports consist of the Q1 antenna port(s) and the Q2 antenna port(s), the Q is a sum of the Q1 and the Q2.

In one subembodiment, a downlink channel parameter corresponding to the Q1 antenna port(s) and a downlink channel parameter corresponding to the Q2 antenna port(s) constitute a first channel matrix, the first channel matrix is used to generate first channel information.

In one subembodiment, a total number of rows contained by the first channel matrix is equal to a sum of the Q1 and the Q2.

In one subembodiment, the downlink channel parameter corresponding to the Q1 antenna port(s) and the downlink channel parameter corresponding to the Q2 antenna port(s) are Channel Impulse Response (CIR) respectively.

EMBODIMENT 4

Figure 4:
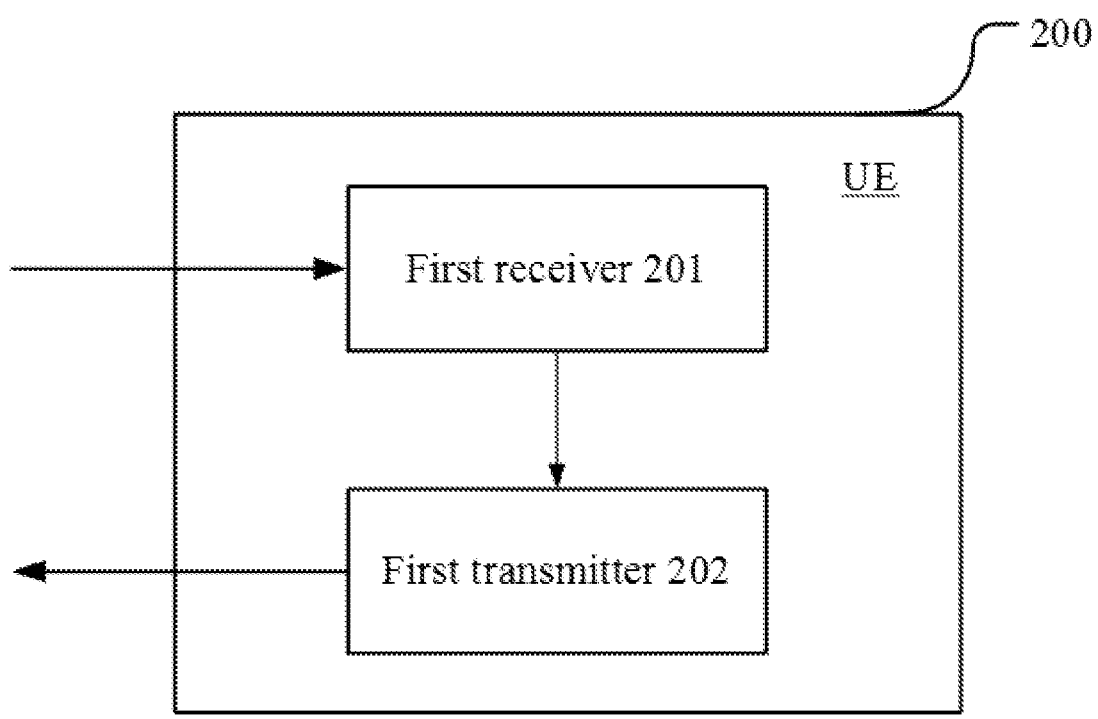
FIG. 4 is a structure block diagram illustrating a processing device in a UE according to one embodiment of the present disclosure.

Embodiment 4 illustrates a structure block diagram illustrating a processing device in a UE, as shown in FIG. 4.

In FIG. 4, a UE device 200 mainly consists of a first receiver 201 and a first transmitter 202.

A first receiver 201 receives a first signaling, a second signaling, a first reference signal and a second reference signal; a first transmitter 202 transmits first channel information.

In Embodiment 4, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the first transmitter 202 further transmits first information. Herein, the first information indicates Q3 antenna port(s) out of the L1 antenna port(s). The Q3 is a positive integer less than or equal to the L1.

In one embodiment, the first receiver 201 further receives second information. Herein, the second information indicates the Q1 antenna port(s) out of the L1 antenna port(s).

In one embodiment, the first receiver 201 further receives a first radio signal. Herein, the first channel information is used to generate the first radio signal.

In one embodiment, position(s) of the Q1 antenna port(s) in the Q antenna ports is(are) determined by default.

In one embodiment, beamforming vector(s) corresponding to the Q1 antenna port(s) is(are) used to determine beamforming vector(s) corresponding to transmission antenna port(s) for the second signaling.

EMBODIMENT 5

Figure 5:
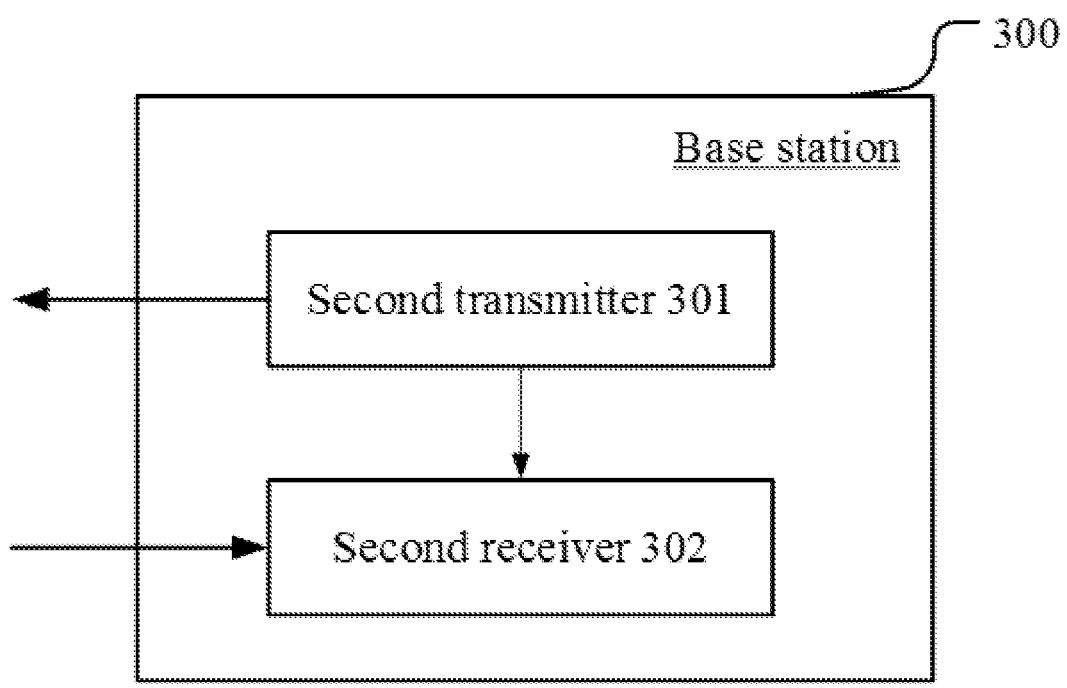
FIG. 5 is a structure block diagram illustrating a processing device in a base station according to one embodiment of the present disclosure.

Embodiment 5 illustrates a structure block diagram illustrating a processing device in a base station, as shown in FIG. 5.

In FIG. 5, a base station 300 mainly consists of a second transmitter 301 and a second receiver 302.

A second transmitter 301 transmits a first signaling, a second signaling, a first reference signal and a second reference signal; a second receiver 302 receives first channel information.

In Embodiment 5, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the second receiver 302 further receives first information. Herein, the first information indicates Q3 antenna port(s) out of the L1 antenna port(s); the Q3 is a positive integer less than or equal to the L1.

In one embodiment, the second transmitter 301 further transmits second information. Herein, the second information indicates the Q1 antenna port(s) out of the L1 antenna port(s).

In one embodiment, position(s) of the Q1 antenna port(s) in the Q antenna ports is(are) determined by default.

In one embodiment, beamforming vector(s) corresponding to the Q1 antenna port(s) is(are) used to determine beamforming vector(s) corresponding to transmission antenna port(s) for the second signaling.

In one embodiment, the second transmitter 301 further transmits a first radio signal. Herein, the first channel information is used to generate the first radio signal.

EMBODIMENT 6

Figure 6:
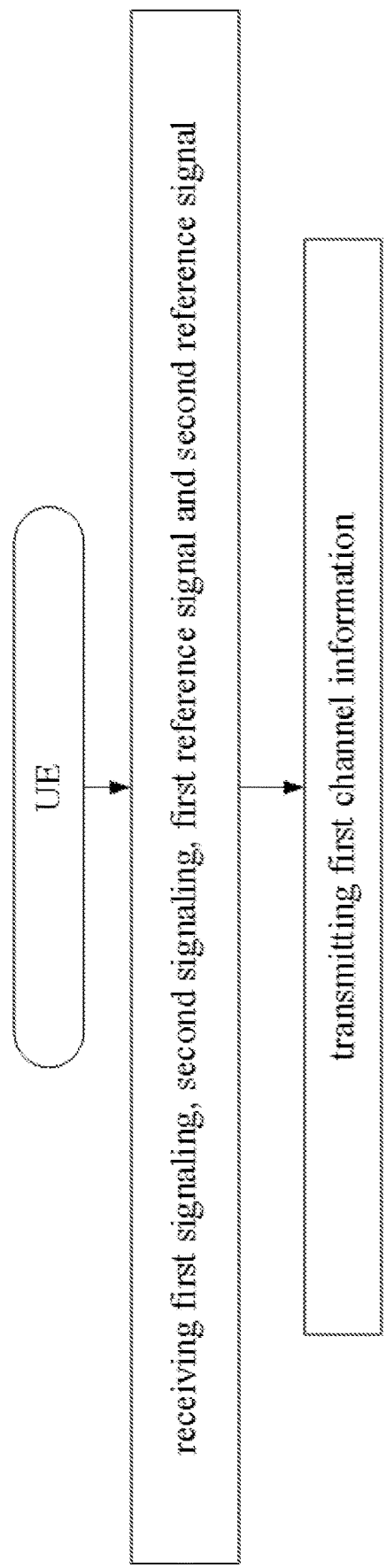
FIG. 6 is a flowchart of a first signaling, a second signaling, a first reference signal and a second reference signal and first channel information according to one embodiment of the present disclosure.

Embodiment 6 illustrates a flowchart of a first signaling, a second signaling, a first reference signal and a second reference signal and first channel information, as shown in FIG. 6.

In Embodiment 6, the UE of the present disclosure first receives a first signaling, a second signaling, a first reference signal and a second reference signal; and then transmits first channel information. Herein, the first reference signal comprises Q1 RS port(s), the Q1 RS port(s) is(are) transmitted by Q1 antenna port(s) respectively; the second reference signal comprises Q2 RS port(s), the Q2 RS port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2.

In one embodiment, the first channel information is CSI.

In one embodiment, a measurement of the first reference signal and the second reference signal is used to determine the first channel information.

In one embodiment, the first channel information comprises at least one of RI, PTI, PMI, CQI or channel parameter quantization value or at least one of its groups.

In one embodiment, the first signaling is a higher-layer signaling, the second signaling is a physical layer signaling.

In one subembodiment, the first signaling is an RRC layer signaling.

In one embodiment, the first signaling is a physical layer signaling, the second signaling is a physical layer signaling.

In one embodiment, the first signaling triggers multiple transmissions from the L1 antenna port(s), the second signaling triggers a transmission from the Q2 antenna port(s), the Q1 antenna port(s) is(are) a subset of the L1 antenna port(s).

In one embodiment, the first signaling is common to a cell.

In one embodiment, the first signaling is an MIB.

In one embodiment, the first signaling is an SIB.

In one embodiment, the Q1 is 1.

In one embodiment, the Q1 is equal to the L1.

In one embodiment, the Q1 antenna port(s) and the Q2 antenna port(s) do not overlap each other, there does not exist any of the antenna port(s) that belongs to the Q1 antenna port(s) and the Q2 antenna port(s) at the same time.

In one embodiment, a channel estimation for the Q1 antenna port(s) may be performed by measuring the first reference signal, with no need to include reference signals transmitted from the Q1 antenna port(s) into the second reference signal, thereby reducing an overhead of the second reference signal.

In one embodiment, the first reference signal is transmitted in a first time resources pool, the second reference signal is transmitted in a second time resources pool.

In one subembodiment, the first reference signal occurs multiple times in the first time resources pool, and time intervals between any two adjacent occurrences of the first reference signal in the first time resources pool are equal.

In one subembodiment, the second reference signal occurs once in the second time resources pool.

In one subembodiment, the first time resources pool comprises a positive integer number of time unit(s), the second time resources pool comprises a positive integer number of consecutive time units. In one subembodiment, the time unit is a subframe. In one subembodiment, the time unit is 1 ms. In one subembodiment, time units in the second time resources pool do not belong to the first time resources pool. In one subembodiment, time units in the second time resources pool belong to the first time resources pool.

In one embodiment, physical layer channels corresponding to the second signaling comprise a downlink physical layer control channel (i.e., a downlink channel which can only be used for bearing physical layer control information). In one subembodiment, the downlink physical layer control channel is a PDCCH.

In one embodiment, the first reference signal is wideband. In one subembodiment, a system bandwidth is divided into a positive integer number of frequency domain(s), the first reference signal occurs in all frequency domain(s) within the system bandwidth, a bandwidth corresponding to each of the frequency domain(s) is equal to a difference between frequency domain resources occupied by two adjacent occurrences of the first reference signal in frequency domain.

In one embodiment, the second reference is wideband.

In one embodiment, the second reference signal is narrowband. In one subembodiment, a system bandwidth is divided into a positive integer number of frequency domain(s), the second reference signal only occurs in part of the frequency domain(s).

In one embodiment, an antenna port is formed by multiple antennas through antenna virtualization superposition, a mapping coefficient of the multiple antennas to the antenna port constitutes a beamforming vector. In one subembodiment, small scale characteristics of a radio channel experienced by signals transmitted from a first antenna port cannot be used to infer small scale characteristics of a radio channel experienced by signals transmitted from a second antenna port. The first antenna port and the second antenna port are any two different antenna ports.

In one embodiment, the first channel information comprises Uplink Control Information (UCI).

In one embodiment, the first channel information is transmitted on an uplink physical layer control channel (i.e., an uplink channel which can only be used for bearing physical layer signaling). In one subembodiment, the uplink physical layer control channel is a PUCCH.

In one embodiment, the first channel information is transmitted on an uplink physical layer data channel (i.e., an uplink channel which can be used for bearing physical layer data). In one subembodiment, the uplink physical layer data channel is a PUSCH.

In one embodiment, the first channel information is used to determine a first matrix, an overall number of rows contained by the first matrix is equal to the Q.

In one subembodiment, the first matrix is formed by quantization of a first channel matrix, the first reference signal is used to determine a downlink channel parameter corresponding to the Q1 antenna port(s), the second reference signal is used to determine a downlink channel parameter corresponding to the Q2 antenna port(s), the downlink channel parameter corresponding to the Q1 antenna port(s) and the downlink channel parameter corresponding to the Q2 antenna port(s) constitute the first channel matrix.

In one subembodiment, the downlink channel parameter corresponding to the Q1 antenna port(s) and the downlink channel parameter corresponding to the Q2 antenna port(s) are CIR respectively.

In one subembodiment, the first channel information is quantization information of the first matrix. In one subembodiment, the first channel information is an index for the first matrix in a candidate matrix set, the candidate matrix set comprises a positive integer number of matrices.

In one subembodiment, the first channel information comprises M index group(s) and M parameter group(s), the M index group(s) is(are) used to determine M vector group(s), the M vector group(s) and the M parameter group(s) have a one-to-one correspondence relationship, the M vector group(s) and the M parameter group(s) are respectively used to generate M composite vector(s), the M composite vector(s) is(are) used to determine the first matrix. The M is a positive integer.

In one subembodiment, vector(s) of the M vector group(s) belongs (belong) to a candidate vector set, the candidate vector set comprises a positive integer number of vectors.

In one subembodiment, a given composite vector is a sum of vectors of a given vector group weighted by parameter(s) in a given parameter group, wherein the given composite vector is any one of the M composite vector(s), the given vector group is the vector group used to generate the given composite vector in the M vector group(s), the given parameter group is the parameter group used to generate the given composite vector in the M parameter group(s).

In one subembodiment, the first matrix consists of M composite vector(s) as column vector(s).

In one subembodiment, one of the vector group comprises L vectors, a corresponding coefficient group comprises L−1 coefficient(s).

In one subembodiment, one of the vector group comprises L vectors, a corresponding coefficient group comprises L coefficients.

EMBODIMENT 7

Figure 7:
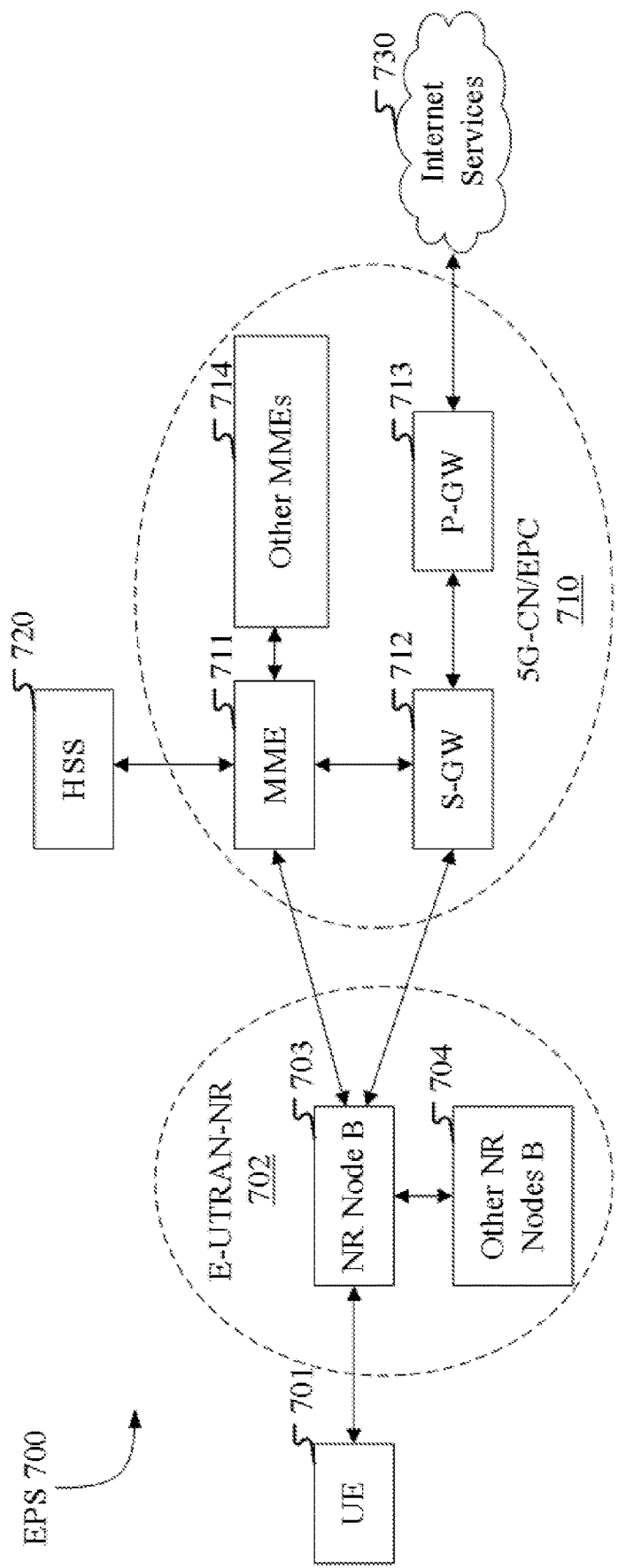
FIG. 7 is a schematic diagram illustrating a network architecture according to one embodiment of the present disclosure.

Embodiment 7 illustrates a schematic diagram of a network architecture, as shown in FIG. 7.

Embodiment 7 illustrates a network architecture 700 of Long-Term Evolution (LTE), Long-Term Evolution Advanced (LTE-A), and NR 5G systems. The LTE network architecture 700 may be called an Evolved Packet System (EPS) 700. The EPS 700 may comprise one or more UEs 701, an E-UTRAN-NR 702, a 5G-CoreNetwork/Evolved Packet Core (5G-CN/EPC) 710, a Home Subscriber Server (HHS) 720 and an Internet Service 730. Herein, UMTS refers to Universal Mobile Telecommunications System. The EPS 700 may be interconnected with other access networks. For simple description, the entities/interfaces are not shown. As shown in FIG. 7, the EPS 700 provides packet switching services. Those skilled in the art will find it easy to understand that various concepts presented throughout the present disclosure can be extended to networks providing circuit switching services. The E-UTRAN-NR 702 comprises an NR node B (gNB) 703 and other gNBs 704. The gNB 703 provides UE 701 oriented user plane and control plane protocol terminations. The gNB 703 may be connected to other gNBs 704 via an X2 interface (for example, backhaul). The gNB 703 may be called a base station, a base transceiver station, a radio base station, a radio transceiver, a transceiver function, a Base Service Set (BBS), an Extended Service Set (ES S), a Transmitter Receiver Point (TRP) or some other applicable terms. The gNB 703 provides an access point of the 5G-CN/EPC 710 for the UE 701. Examples of UE 701 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 701 a mobile station, a subscriber station, a mobile unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 703 is connected to 5G-CN/EPC 710 via an S1 interface. The 5G-CN/EPC 710 comprises an MME 711, other MMES 714, a Service Gateway (S-GW) 712 and a Packet Date Network Gateway (P-GW) 713. The MME 711 is a control node for processing a signaling between the UE 701 and the 5G-CN/EPC 710. Generally, the MME 711 provides bearer and connection management. All user Internet Protocol (IP) packets are transmitted through the S-GW 712, the S-GW 712 is connected to the P-GW 713. The P-GW 713 provides UE IP address allocation and other functions. The P-GW 713 is connected to the Internet Service 730. The Internet Service 730 comprises IP services corresponding to operators, specifically including Internet, Intranet, IP Multimedia Subsystem (IMS) and Packet Switching Streaming Services (PSSs).

In one embodiment, the UE 701 corresponds to the UE in the present disclosure.

In one embodiment, the gNB 703 corresponds to the base station in the present disclosure.

EMBODIMENT 8

Figure 8:
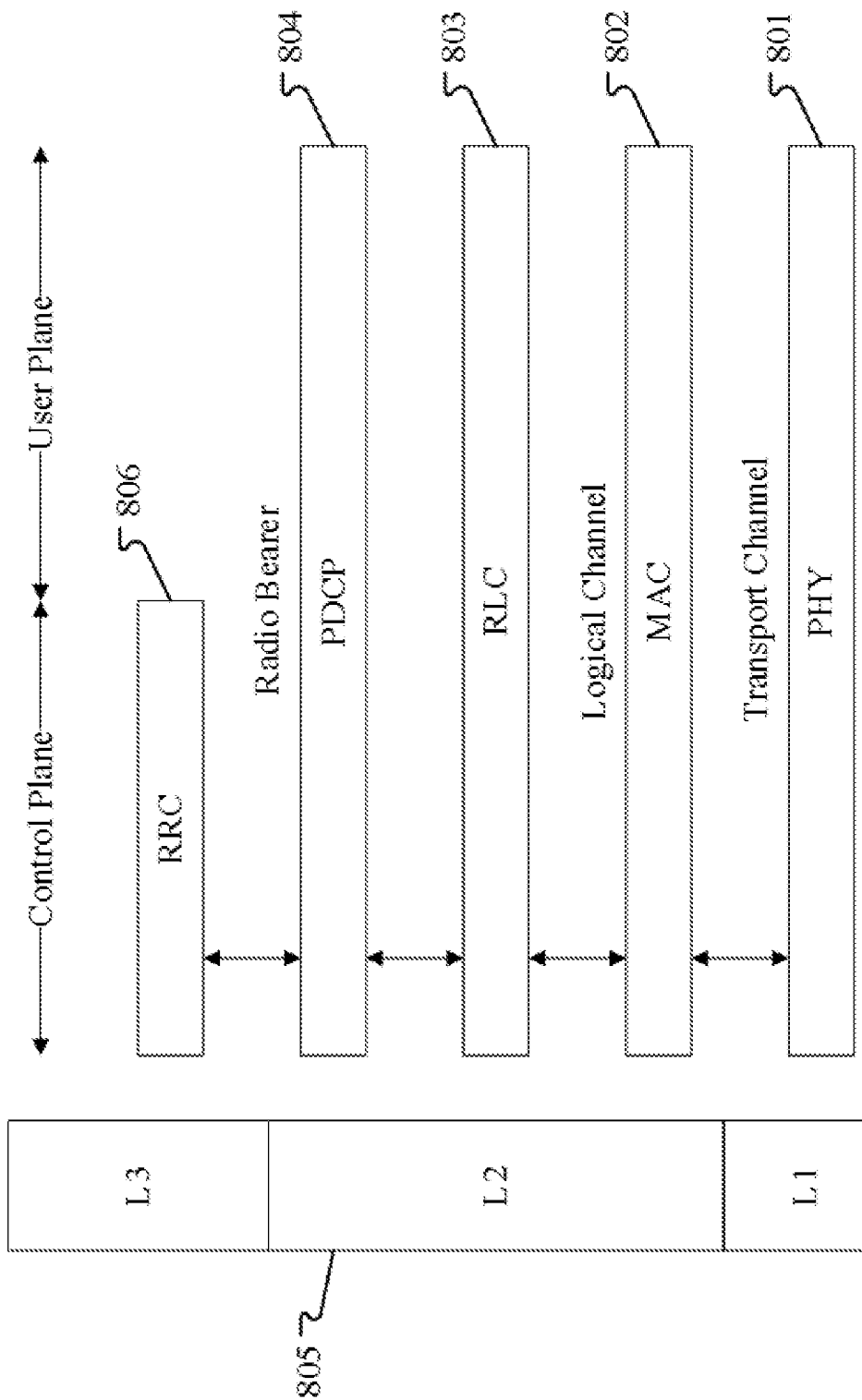
FIG. 8 is a schematic diagram illustrating a radio protocol architecture of a user plane and a control plane according to one embodiment of the present disclosure.

Embodiment 8 illustrates a schematic diagram of a radio protocol architecture of a user plane and a control plane, as shown in FIG. 8.

FIG. 8 is a schematic diagram illustrating a radio protocol architecture of a user plane and a control plane. In FIG. 8, the radio protocol architecture of a UE and a gNB is represented by three layers: which are a layer 1, a layer 2 and a layer 3 respectively. The layer 1 (L1) is the lowest layer and performs signal processing functions of various PHY layers. The layer 1 is called PHY 801 in this disclosure. The layer 2 (L2) 805 is above the PHY 801, and is in charge of the link between the UE and the gNB via the PHY 801. In the user plane, the L2 805 comprises a Medium Access Control (MAC) sublayer 802, a Radio Link Control (RLC) sublayer 803, and a Packet Data Convergence Protocol (PDCP) sublayer 804. All the three sublayers terminate at the gNB of the network side. Although not described in FIG. 8, the UE may comprise several protocol layers above the L2 805, such as a network layer (i.e., IP layer) terminated at a P-GW 713 of the network side and an application layer terminated at the other side of the connection (i.e., a peer UE, a server, etc.). The PDCP sublayer 804 provides multiplexing among variable radio bearers and logical channels. The PDCP sublayer 804 also provides a header compression for a higher-layer packet so as to reduce a radio transmission overhead. The PDCP sublayer 804 provides security by encrypting a packet and provides support for UE handover between gNBs. The RLC sublayer 803 provides segmentation and reassembling of a higher-layer packet, retransmission of a lost packet, and reordering of a packet so as to compensate the disordered receiving caused by HARQ. The MAC sublayer 802 provides multiplexing between logical channels and transport channels. The MAC sublayer 802 is also responsible for allocating between UEs various radio resources (i.e., resources block) in a cell. The MAC sublayer 802 is also in charge of HARQ operation. In the control plane, the radio protocol architecture of the UE and the gNB is almost the same as the radio protocol architecture in the user plane on the PHY 801 and the L2 805, but there is no header compression for the control plane. The control plane also comprises a Radio Resource Control (RRC) sublayer 806 in the layer 3 (L3). The RRC sublayer 806 is responsible for acquiring radio resources (i.e., radio bearer) and configuring the lower layer using an RRC signaling between the gNB and the UE.

In one embodiment, the radio protocol architecture in FIG. 8 is applicable to the UE in the present disclosure.

In one embodiment, the radio protocol architecture in FIG. 8 is applicable to the base station in the present disclosure.

In one embodiment, the first signaling in the present disclosure is generated by the PHY 801.

In one embodiment, the first signaling in the present disclosure is generated by the MAC sublayer 802.

In one embodiment, the first signaling in the present disclosure is generated by the RRC sublayer 806.

In one embodiment, the second signaling in the present disclosure is generated by the MAC sublayer 802.

In one embodiment, the second signaling in the present disclosure is generated by the PHY 801.

In one embodiment, the first reference signal in the present disclosure is generated by the PHY 801.

In one embodiment, the second reference signal in the present disclosure is generated by the PHY 801.

In one embodiment, the first channel information in the present disclosure is generated by the PHY 801.

In one embodiment, the first information in the present disclosure is generated by the PHY 801.

In one embodiment, the second information in the present disclosure is generated by the PHY 801.

In one embodiment, the second information in the present disclosure is generated by the MAC sublayer 802.

In one embodiment, the first radio signal in the present disclosure is generated by the PHY 801.

EMBODIMENT 9

Figure 9:
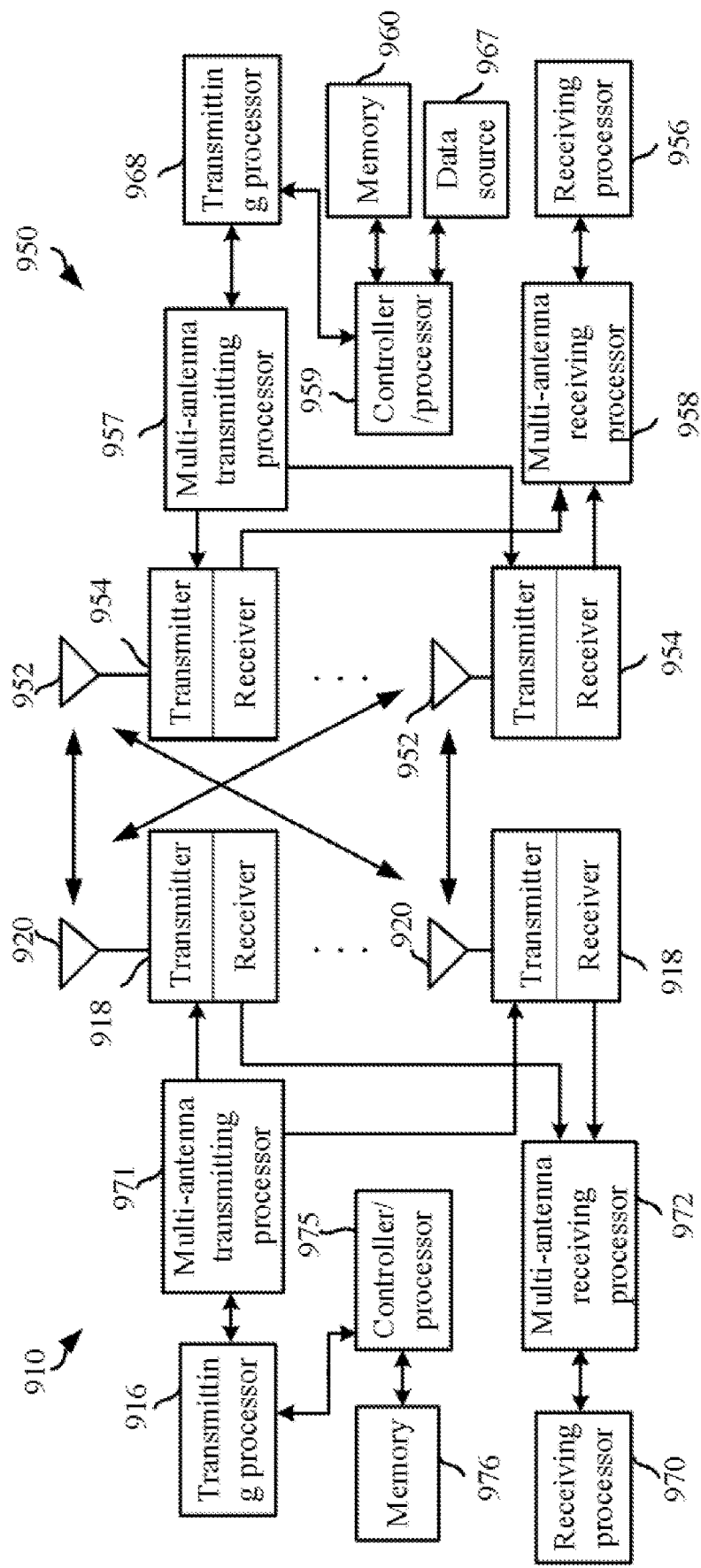
FIG. 9 is a schematic diagram illustrating NewRadio (NR) nodes and a UE according to one embodiment of the present disclosure.

Embodiment 9 illustrates a schematic diagram of an NR node and a UE, as shown in FIG. 9. FIG. 9 is a block diagram of a UE 950 and a gNB 910 that are in communication with each other in an access network.

The gNB 910 comprises a controller/processor 975, a memory 976, a receiving processor 970, a transmitting processor 916, a multi-antenna receiving processor 972, a multi-antenna transmitting processor 971, a transmitter/receiver 918 and an antenna 920.

The UE 950 comprises a controller/processor 959, a memory 960, a data source 967, a transmitting processor 968, a receiving processor 956, a multi-antenna transmitting processor 957, a multi-antenna receiving processor 958, a transmitter/receiver 954 and an antenna 952.

In Downlink (DL) transmission, at the gNB 910, a higher-layer packet from a core network is provided to the controller/processor 975. The controller/processor 975 performs a function of a layer 2. In downlink transmission, the controller/processor 975 provides header compression, encryption, packet segmentation and reordering, and multiplexing between a logical channel and a transport channel, and a radio resources allocation for the UE 950 based on various priorities. The controller/processor 975 is also in charge of HARQ operation, retransmission of a lost packet, and a signaling to the UE 950. The transmitting processor 916 and the multi-antenna transmitting processor 971 perform signal processing functions used for a layer 1 (that is, physical layer). The transmitting processor 916 performs encoding and interleaving so as to enable a Forward Error Correction (FEC) and the mapping to signal clusters corresponding to various modulation schemes (i.e., BPSK, QPSK, M-PSK, M-QAM, etc.) at the UE 950 side. The multi-antenna transmitting processor 971 processes encoded and modulated symbols by a digital spatial precoding/beamforming operation to generate one or more spatial streams. The transmitting processor 916 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then the multi-antenna transmitting processor 971 processes time-domain multicarrier symbol streams by a transmitting analog precoding/beamforming operation. Each transmitter 918 converts a baseband multicarrier symbol stream provided by the multi-antenna transmitting processor 971 into a radio frequency stream and then provides it to different antenna 920.

In downlink transmission, at the UE 950, each receiver 954 receives a signal via its corresponding antenna 952. Each receiver 954 recovers the information modulated to the radio frequency carrier and converts the radio frequency stream into a baseband multicarrier symbol stream to be provided to the receiving processor 956. The receiving processor 956 and the multi-antenna receiving processor 958 perform various signal processing functions of the layer 1. The multi-antenna receiving processor 958 processes the baseband multicarrier symbol stream coming from the receiver 954 by a receiving analog precoding/beamforming operation. The receiving processor 956 converts the baseband multicarrier symbol stream subjected to the receiving analog precoding/beamforming operation from time domain to frequency domain using Fast Fourier Transform (TTF). In the frequency domain, a physical layer data signal and a reference signal are demultiplexed by the receiving processor 956, wherein the reference signal is used for channel estimation, and the data signal is subjected to multi-antenna detection in the multi-antenna receiving processor 958 to recover any spatial stream targeting the UE 950. Symbols on each spatial stream are demodulated and recovered in the receiving processor 956 to generate a soft decision. Then the receiving processor 956 decodes and de-interleaves the soft decision to recover the higher-layer data and control signal on the physical channel transmitted by the gNB 910. Next, the higher-layer data and control signal are provided to the controller/processor 959. The controller/processor 959 performs functions of the layer 2. The controller/processor can be connected to the memory that stores program codes and data. The memory 960 can be called a computer readable media. In downlink transmission, the controller/processor 959 provides demultiplexing between the transport channel and the logical channel, packet reassembling, decryption, header decompression, and control signal processing so as to recover the higher-layer packet coming from the core network. The higher-layer packet then is provided to all protocol layers above the layer 2, or various control signals can be provided to the layer 3 for processing. The controller/processor 959 can also perform error detection using ACK and/or NACK protocols to support HARQ operation.

In uplink (UL) transmission, at the UE 950, the data source 967 provides a higher-layer packet to the controller/processor 959. The data source 967 represents all protocol layers above the layer 2. Similar to the transmitting function of the gNB 910 described in downlink transmission, the controller/processor 959 provides header compression, encryption, packet segmentation and reordering, and multiplexing between a logical channel and a transport channel based on the radio resources allocation of the gNB 910 so as to perform the functions of the layer 2 used for the user plane and the control plane. The controller/processor is also in charge of HARQ operation, retransmission of a lost packet, and a signaling to the gNB 910. The transmitting processor 968 conducts modulation mapping and channel encoding processing; the multi-antenna transmitting processor 957 performs digital multi-antenna spatial precoding/beamforming processing; and subsequently, the transmitting processor modulates the generated spatial streams into a multicarrier/single-carrier symbol stream, which is subjected to an analog precoding/beamforming in the multi-antenna transmitting processor 957 and then is provided to different antennas 952 via the transmitter 954. Each transmitter 954 first converts the baseband symbol stream provided by the multi-antenna transmitting processor 957 into a radio frequency symbol stream and then provides the radio frequency symbol stream to the antenna 952.

In uplink transmission, the function of the gNB 910 is similar to the receiving function of the UE 950 described in the downlink transmission. Each receiver 918 receives a radio frequency signal via the corresponding antenna 920, converts the received radio frequency signal into a baseband signal, and provides the baseband signal to the multi-antenna receiving processor 972 and the receiving processor 970. The receiving processor 970 and the multi-antenna receiving processor 972 together provide functions of the layer 1. The controller/processor 975 provides functions of the layer 2. The controller/processor 975 can be connected to the memory 976 that stores program codes and data. The memory 976 can be called a computer readable media. In uplink transmission, the controller/processor 975 provides multiplexing between the transport channel and the logical channel, packet reassembling, decryption, header decompression, and control signal processing so as to recover a higher-layer packet coming from the UE 950. The higher-layer packet coming from the controller/processor 975 also performs error detection using ACK and/or NACK protocols to support HARQ operation.

In one embodiment, the UE 950 comprises at least one processor and at least one memory, the at least one memory comprises computer program codes; the at least one memory and the computer codes are configured to be used in collaboration with the at least one processor.

In one embodiment, the UE 950 comprises a memory that stores computer readable instruction program. The computer readable instruction program generates an action when executed by at least one processor. The action comprises: receiving the first signaling in the present disclosure, receiving the second signaling in the present disclosure, receiving the first reference signal in the present disclosure, receiving the second reference signal in the present disclosure, transmitting the first channel information, transmitting the first information in the present disclosure, receiving the second information in the present disclosure, receiving the first radio signal in the present disclosure.

In one embodiment, the gNB 910 comprises at least one processor and at least one memory. The at least one memory comprises computer program codes. The at least one memory and the computer program codes are configured to be used in collaboration with the at least one processor.

In one embodiment, the gNB 910 comprises a memory that stores computer readable instruction program. The computer readable instruction program generates an action when executed by at least one processor. The action comprises: transmitting the first signaling in the present disclosure, transmitting the second signaling in the present disclosure, transmitting the first reference signal in the present disclosure, transmitting the second reference signal in the present disclosure, receiving the first channel information in the present disclosure, receiving the first information in the present disclosure, transmitting the second information in the present disclosure, transmitting the first radio signal in the present disclosure.

In one embodiment, the UE 950 corresponds to the UE in the present disclosure.

In one embodiment, the gNB 910 corresponds to the base station in the present disclosure.

In one embodiment, at least one of the antenna 952, the receiver 954, the receiving processor 956, the multi-antenna receiving processor 958 or the controller/processor 959 or at least one of its groups is used to receive the first signaling; and at least one of the antenna 920, the transmitter 918, the transmitting processor 916, the multi-antenna transmitting processor 971, or the controller/processor 975 or at least one of its groups is used to transmit the first signaling.

In one embodiment, at least one of the antenna 952, the receiver 954, the receiving processor 956, the multi-antenna receiving processor 958, or the controller/processor 959 or at least one of its groups is used to receive the second signaling; and at least one of the antenna 920, the transmitter 918, the transmitting processor 916, the multi-antenna transmitting processor 971, or the controller/processor 975 or one of its groups is used to transmit the second signaling.

In one embodiment, at least one of the antenna 952, the receiver 954, the receiving processor 956, the multi-antenna receiving processor 958, or the controller/processor 959 or at least one of its groups is used to receive the first reference signal; and at least one of the antenna 920, the transmitter 918, the transmitting processor 916, the multi-antenna transmitting processor 971, or the controller/processor 975 or at least one of its groups is used to transmit the first reference signal.

In one embodiment, at least one of the antenna 952, the receiver 954, the receiving processor 956, the multi-antenna receiving processor 958, or the controller/processor 959 or at least one of its groups is used to receive the second reference signal; and at least one of the antenna 920, the transmitter 918, the transmitting processor 916, the multi-antenna transmitting processor 971, or the controller/processor 975 or at least one of its groups is used to transmit the second reference signal.

In one embodiment, at least one of the antenna 920, the receiver 918, the receiving processor 970, the multi-antenna receiving processor 972, or the controller/processor 975 or at least one of its groups is used to receive the first channel information; and at least one of the antenna 952, the transmitter 954, the transmitting processor 968, the multi-antenna transmitting processor 957, or the controller/processor 959 or at least one of its groups is used to transmit the first channel information.

In one embodiment, at least one of the antenna 920, the receiver 918, the receiving processor 970, the multi-antenna receiving processor 972, or the controller/processor 975 or at least one of its groups is used to receive the first information; and at least one of the antenna 952, the transmitter 954, the transmitting processor 968, the multi-antenna transmitting processor 957, or the controller/processor 959 or at least one of its groups is used to transmit the first information.

In one embodiment, at least one of the antenna 952, the receiver 954, the receiving processor 956, the multi-antenna receiving processor 958, or the controller/processor 959 or at least one of its groups is used to receive the second information; and at least one of the antenna 920, the transmitter 918, the transmitting processor 916, the multi-antenna transmitting processor 971, or the controller/processor 975 or at least one of its groups is used to transmit the second information.

In one embodiment, at least one of the antenna 952, the receiver 954, the receiving processor 956, the multi-antenna receiving processor 958, or the controller/processor 959 or at least one of its groups is used to receive the first radio signal; and at least one of the antenna 920, the transmitter 918, the transmitting processor 916, the multi-antenna transmitting processor 971, or the controller/processor 975 or at least one of its groups is used to transmit the first radio signal.

In one embodiment, the first receiver 201 in Embodiment 4 comprises at least one of the antenna 952, the receiver 954, the receiving processor 956, the multi-antenna receiving processor 958, the controller/processor 959, the memory 960, or the data source 967 or at least one of its groups.

In one embodiment, the first transmitter 202 in Embodiment 4 comprises at least one of the antenna 952, the transmitter 954, the transmitting processor 968, the multi-antenna transmitting processor 957, the controller/processor 959, the memory 960, or the data source 967 or at least one of its groups.

In one embodiment, the second transmitter 301 in Embodiment 5 comprises at least one of the antenna 920, the transmitter 918, the transmitting processor 916, the multi-antenna transmitting processor 971, the controller/processor 975, or the memory 976 or at least one of its groups.

In one embodiment, the second receiver 302 in Embodiment 5 comprises at least one of the antenna 920, the receiver 918, the receiving processor 970, the multi-antenna receiving processor 972, the controller/processor 975, or the memory 976 or at least one of its groups.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensors, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present disclosure includes but is not limited to macro-cellular base stations, micro-cellular base stations, home base stations, relay base stations, NR node B (Gnb), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for multi-antenna transmission, comprising:
   receiving a first signaling, a second signaling, a first reference signal and a second reference signal; and
   transmitting first channel information;
   wherein the first reference signal comprises Q1 reference signal port(s), the Q1 reference signal port(s) is(are) transmitted by Q1 antenna port(s) respectively; the second reference signal comprises Q2 reference signal port(s), the Q2 reference signal port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2; the first reference signal is transmitted in a first time resources pool, and the second reference signal is transmitted in a second time resources pool, the first reference signal occurs multiple times in the first time resources pool, and time intervals between any two adjacent occurrences of the first reference signal in the first time resources pool are equal, the second reference signal occurs once in the second time resources pool.

2. The method according to claim 1, comprising:
   transmitting first information;
   wherein the first information indicates Q3 antenna port(s) out of the L1 antenna port(s); the Q3 is a positive integer less than or equal to the L1.

3. The method according to claim 1, comprising:
   receiving second information;
   wherein the second information indicates the Q1 antenna port(s) out of the L1 antenna port(s).

4. The method according to claim 1, wherein beamforming vector(s) corresponding to the Q1 antenna port(s) is(are) used to determine beamforming vector(s) corresponding to transmission antenna port(s) for the second signaling.

5. The method according to claim 1, comprising:
   the first signaling is a higher-layer signaling, and the second signaling is a physical layer signaling.

6. A method in a base station for multi-antenna transmission, comprising:
   transmitting a first signaling, a second signaling, a first reference signal and a second reference signal; and
   receiving first channel information;
   wherein the first reference signal comprises Q1 reference signal port(s), the Q1 reference signal port(s) is(are) transmitted by Q1 antenna port(s) respectively; the second reference signal comprises Q2 reference signal port(s), the Q2 reference signal port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2; the first reference signal is transmitted in a first time resources pool, and the second reference signal is transmitted in a second time resources pool, the first reference signal occurs multiple times in the first time resources pool, and time intervals between any two adjacent occurrences of the first reference signal in the first time resources pool are equal, the second reference signal occurs once in the second time resources pool.

7. The method according to claim 6, comprising:
   receiving first information;
   wherein the first information indicates Q3 antenna port(s) out of the L1 antenna port(s); the Q3 is a positive integer less than or equal to the L1.

8. The method according to claim 6, comprising:
   transmitting second information;
   wherein the second information indicates the Q1 antenna port(s) out of the L1 antenna port(s).

9. The method according to claim 6, wherein beamforming vector(s) corresponding to the Q1 antenna port(s) is(are) used to determine beamforming vector(s) corresponding to transmission antenna port(s) for the second signaling.

10. The method according to claim 6, comprising:
    the first signaling is a higher-layer signaling, and the second signaling is a physical layer signaling.

11. A User Equipment (UE) for multi-antenna transmission, comprising:
    a first receiver: receiving a first signaling, a second signaling, a first reference signal and a second reference signal; and
    a first transmitter: transmitting first channel information;
    wherein the first reference signal comprises Q1 reference signal port(s), the Q1 reference signal port(s) is(are) transmitted by Q1 antenna port(s) respectively; the second reference signal comprises Q2 reference signal port(s), the Q2 reference signal port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2; the first reference signal is transmitted in a first time resources pool, and the second reference signal is transmitted in a second time resources pool, the first reference signal occurs multiple times in the first time resources pool, and time intervals between any two adjacent occurrences of the first reference signal in the first time resources pool are equal, the second reference signal occurs once in the second time resources pool.

12. The UE according to claim 11, wherein the first transmitter transmits first information; wherein the first information indicates Q3 antenna port(s) out of the L1 antenna port(s); the Q3 is a positive integer less than or equal to the L1.

13. The UE according to claim 11, wherein the first receiver receives second information; wherein the second information indicates Q1 antenna port(s) out of the L1 antenna port(s).

14. The UE according to claim 11, wherein beamforming vector(s) corresponding to the Q1 antenna port(s) is(are) used to determine beamforming vector(s) corresponding to transmission antenna port(s) for the second signaling.

15. The UE according to claim 11, wherein the first signaling is a higher-layer signaling, and the second signaling is a physical layer signaling.

16. A base station for multi-antenna transmission, comprising:
a second transmitter: transmitting a first signaling, a second signaling, a first reference signal and a second reference signal;
a second receiver: receiving first channel information;
wherein the first reference signal comprises Q1 reference signal port(s), the Q1 reference signal port(s) is(are) transmitted by Q1 antenna port(s) respectively; the second reference signal comprises Q2 reference signal port(s), the Q2 reference signal port(s) is(are) transmitted by Q2 antenna port(s) respectively; the first signaling is used to determine L1 antenna port(s), the Q1 antenna port(s) is(are) a subset of the L1 antenna port(s); the second signaling is used to determine the Q2 antenna port(s); wherein the Q1 and the Q2 are positive integers respectively, the L1 is a positive integer greater than or equal to the Q1; the first channel information corresponds to Q antenna ports; the Q antenna ports consist of the Q1 antenna port(s) and the Q2 antenna port(s), the Q is equal to a sum of the Q1 and the Q2; the first reference signal is transmitted in a first time resources pool, and the second reference signal is transmitted in a second time resources pool, the first reference signal occurs multiple times in the first time resources pool, and time intervals between any two adjacent occurrences of the first reference signal in the first time resources pool are equal, the second reference signal occurs once in the second time resources pool.

17. The base station according to claim 16, wherein the second receiver receives first information; wherein the first information indicates Q3 antenna port(s) out of the L1 antenna port(s); the Q3 is a positive integer less than or equal to the L1.

18. The base station according to claim 16, wherein the second transmitter transmits second information; wherein the second information indicates Q1 antenna port(s) out of the L1 antenna port(s).

19. The base station according to claim 16, wherein beamforming vector(s) corresponding to the Q1 antenna port(s) is(are) used to determine beamforming vector(s) corresponding to transmission antenna port(s) for the second signaling.

20. The base station according to claim 16, wherein the first signaling is a higher-layer signaling, and the second signaling is a physical layer signaling.

* * * * *